T. D. BURRALL.
Harvester.
No. 696. Reissued April 26, 1859.
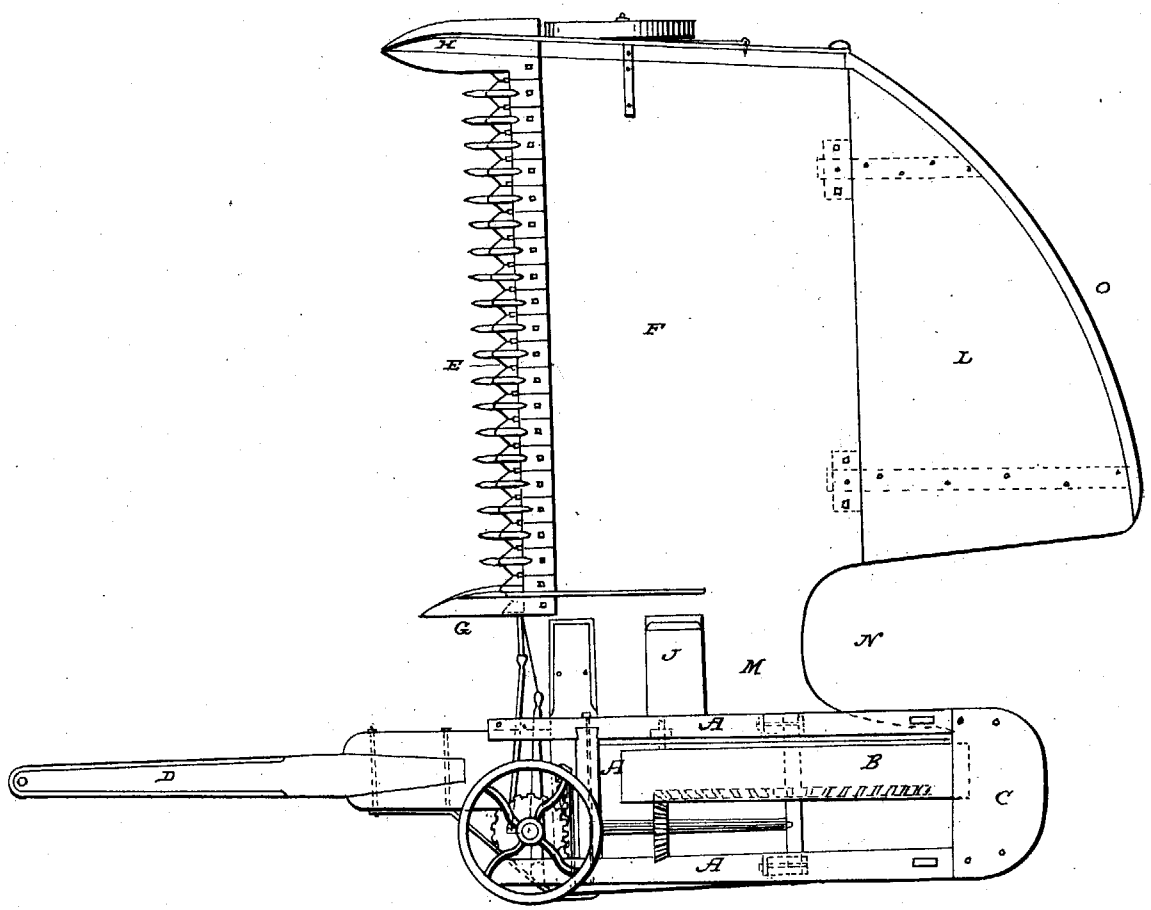
WITNESSES:
Geo. H. Quinlan
N. A. Burrall
INVENTOR.
Thomas D. Burrall
N. PETERS, Photo-Lithographer, Washington, D. C.

UNITED STATES PATENT OFFICE.

THOMAS D. BURRALL, OF GENEVA, NEW YORK.

IMPROVEMENT IN GRAIN-HARVESTERS.

Specification forming part of Letters Patent No. 9,644, dated April 5, 1853; Reissue No. 696, dated April 26, 1859.

DIVISION B.

*To all whom it may concern:*

Be it known that I, THOMAS D. BURRALL, of Geneva, in the county of Ontario and State of New York, have invented certain new and useful Improvements in Grain-Harvesters; and I do hereby declare the following to be a full, clear, and exact description of the same, reference being had to the accompanying drawing, making a part of this specification, and which represents a top plan of a grain-harvester.

The nature of my invention consists in the location of the raker's seat or stand at the platform side of the main frame, within the angle formed by the plane of the driving-wheel and the finger-bar, so that the raker may reach forward with the rake into the uncut grain and draw it to the cutters, and by a continuation of the motion of his rake, or by a succeeding operation of it, deliver the cut material in a gavel on the ground at the side of the platform, out of the way of the machine on its succeeding swath; and also in making the platform of such dimensions and form that the raker, by an easy quarter-turn motion of the rake, can slide the grain off the platform at the side, as will be explained.

To enable others skilled in the art to make and use my invention, I will proceed to describe the same with reference to the drawing.

A represents a main frame supported on a wheel, B, that is also the drive-wheel.

C is the driver's seat, and D the tongue.

The gearing for driving the cutter, the cutters themselves, and the devices for raising and lowering the machine, so as to cut higher or lower, I do not propose to describe, as they are fully shown in an application for a reissue bearing even date with this application.

E are the cutters.

G is the inside divider, and H the outside divider.

I is the raker's seat or stand. It is located at the platform side of the main frame, behind the line of the finger-bar, and on the platform side of the plane of the driving-wheel, or in the angle formed by the plane of the driving-wheel and the plane of the finger-bar, so that the raker upon it will have a foot-support upon the main frame or platform, or upon both. The seat is far enough forward to enable the raker to reach with his rake into the standing grain (if its tangled or lodged condition makes it advisable to do so) and draw it toward the cutters, and it is far enough back to enable the raker while he sits or stands, fronting the cutters, to deliver the gavels at the side in such a position as to be out of the way of the machine on its next swath. It is obvious that the raker in this position may deliver the gavels at the side in two ways—first, by drawing the grain out toward him and forming a gavel on that portion of the platform M nearest the driving-wheel, shoving the gavel back till it drops off the platform through a space, N, left for that purpose; second, by extending the platform farther back and making the back side of it circular or slanting the raker may, by an easy quarter-turn of the rake, sweep the grain off the platform at the side in the rear, or nearly so, of the driving-wheel. The latter method is much the easiest and most convenient, and to enable the raker to deliver the grain in this way I construct the platform F with the rear portion, L, extending back sufficiently to allow the grain to be moved off in an arc of a circle by an easy sweep of the rake, and the rear edge, O, turned to correspond with the circular motion of the grain.

With a platform so constructed the raker is nearly in the center of motion of the grain as it is being removed from the platform, and at the same time he is so seated that he may reach with his rake into the standing grain and draw it toward the cutters, which sever it, and by simply continuing the motion of his rake with a circular sweep deliver the gavel to the ground, out of the way of the machine on its succeeding swath, and he can do this without any pulling or lifting, and with but little muscular exertion.

Having thus fully described the nature and object of my invention, what I claim therein as new, and desire to secure by Letters Patent, is—

1. The location of the raker's seat with regard to the drive-wheel and platform, as described, and for the purpose set forth.

2. In combination with a raker's seat, located as described, extending of the rear of the platform far enough back to allow the raker from his seat to turn the grain upon the platform and rake it off in an arc of a circle by a circular sweep or quarter-turn movement of his rake, substantially as described.

THOMAS D. BURRALL.

Witnesses:
GEO. B. DUSENBERRE,
W. D. BURRALL.